United States Patent [19]

Iida

[11] Patent Number: 4,688,389
[45] Date of Patent: Aug. 25, 1987

[54] AUTOMOTIVE AIR-CONDITIONING SYSTEM

[75] Inventor: Katsumi Iida, Saitama, Japan

[73] Assignee: Diesel Kiki Kabushiki Kaisha, Tokyo, Japan

[21] Appl. No.: 840,626

[22] Filed: Mar. 17, 1986

[30] Foreign Application Priority Data

Mar. 18, 1985 [JP] Japan .................................. 60-53982

[51] Int. Cl.⁴ ............................................. F25B 49/00
[52] U.S. Cl. ........................................ 62/127; 62/163; 165/11.1
[58] Field of Search ................. 62/126, 127, 129, 243, 62/244, 161, 162, 163, 164; 236/94; 165/11, 42, 43

[56] References Cited

U.S. PATENT DOCUMENTS

| | | |
|---|---|---|
| 4,223,720 | 9/1980 | Poirier d'Ange d'Orsay et al. .......................................... 165/14 |
| 4,358,050 | 11/1982 | Naganoma et al. .............. 165/42 X |
| 4,381,549 | 4/1983 | Stamp, Jr. et al. ............ 165/11.1 X |
| 4,442,885 | 4/1984 | Matsuzaki ......................... 62/163 X |
| 4,478,274 | 10/1984 | Naganoma et al. .............. 62/243 X |

Primary Examiner—Harry Tanner
Attorney, Agent, or Firm—Flynn, Thiel, Boutell & Tanis

[57] ABSTRACT

The present invention relates to an automotive air-conditioning system comprising an arithmetic means, control means, diagnostic control means and diagnostic setting means. The invention enables one to diagnose whether output devices such as an air mixing door, a compressor or the like are normally operable or not.

9 Claims, 5 Drawing Figures

4,688,389

AUTOMOTIVE AIR-CONDITIONING SYSTEM

BACKGROUND OF THE INVENTION

1. Field of the Invention

The present invention relates to an automotive air-conditioning system and more specifically, to an automotive air-conditioning system capable of diagnosing that each output device is properly operable or not.

2. Description of the Prior Art

A conventional automotive air-conditioning system is illustrated in FIG. 4. As shown in FIG. 4, it includes a duct 1 provided with a selector door 2 for selectively establishing the fresh air intake mode or the room air recirculating mode, a blower 3, a heat exchanger 4, an air mixing door 5, a heater door 6, mode changing doors 7, a window defrosting opening 8, a center opening 9 and a foot opening 10. The heat exchanger 4, a compressor 11, a condenser 12, a receiver tank 13 and an expansion valve 14 constitute a cooling system. The compressor 11 is connected through a magnetic clutch 16 to an engine 15. An analog to digital (A/D) converter 17 receives analog signals representing passenger compartment temperature or room temperature Tr detected by a room temperature sensor 18, an opening of the air mixing door 5 detected by a potentionmeter 19, intensity of insolation Ts detected by an insolation sensor 20, fresh air temperature Ta detected by a fresh air temperature sensor 21, heat exchanger temperature Tm detected by a heat exchanger temperature sensor 22 and a reference or set temperature TD provided by a temperature setting unit 23, and gives the corresponding digital signals to a control unit 24.

The control unit 24 is a computerized control unit comprising a selector door control means 27 for controlling the selector door 2 through a changeover circuit 25 and an actuator 26, a compressor control means 29 for controlling the magnetic clutch 16 through a driving circuit 28, a blower control means 31 for controlling the blower 3 through a driving circuit 30, an air mixing door control means 34 for controlling the air mixing door 5 through a driving circuit 32 and an actuator 33, a mode changing door control means 37 for controlling the mode changing doors 7 through a changeover circuit 35 and an actutor 36, and an arithmetic means 38 which processes the data corresponding to room temperature Tr, intensity of isolation Ts, fresh air temperature Ta, heat exchanger temperature Tm and set temperature TD and gives combined signals T to the control means 27, 29, 31, 34 and 37. Indicated at 39 is a manual switch for controlling the blower 3. The blower control means 31 controls the blower 3 depending on the status of operation.

The compressor control means 29 turns off the compressor 11 when the exchange temperature Tm is lowered to the temperature level L1 (stored in a setting unit) which is slightly higher than the freezing temperature of the heat exchanger 4, and turns on the compressor 11 when the temperature Tm is increased to the temperature level L2 (stored in a setting unit) which is higher in the range of hysteresis than the level L1 so that the temperature in the heat exchanger 4 is kept constant.

The setting unit or a manual switch 39 comprises an off-setting switch 39a, an automatic control setting switch 39b, a low speed setting switch 39c, a middle speed setting switch 39d and a high speed setting switch 39e. When the off-setting switch 39a is selected, the blower control means 31 stops the blower 3, when the automatic control setting switch 39b is selected, the blower control means 31 sets the speed of the blower to that corresponding to the combined signal T, when the low speed setting switch 39c is selected, the blower control means 31 sets the blower 3 to a low speed, when the middle speed setting switch 39d is selected, the blower control means 31 set the blower 3 to a middle speed, and when the high speed setting switch 39e is selected, the blower control means 31 sets the blower 3 to a high speed.

In the automotive air-conditioning system art, there is known Japanese Laid-Open Patent Publication No. 57-13520 which discloses a method to diagnose whether the output devices such as the selector door 2, the air mixing door 5, the mode changing doors 7, the compressor 11 and the like are properly operated or not. This is performed by driving each of the output devices in accordance with a sequential order based on a self-diagnosing program. This has however drawbacks that some time is required for diagnosing the output devices since some time is required until the output devices are actuated after operable status thereof has been diagnosed, and repetitive inspection of the same output devices is not performed.

SUMMARY OF THE INVENTION

It is an object of the present invention to provide an automotive air-conditioning system being able to diagnose that the output devices such as an air mixing door, a compressor or the like are normally operable or not.

Another object of the present invention is to provide an automotive air-conditioning system being able to diagnose in a short time and smoothly the output devices such as an air mixing door, a compressor or the like.

An automotive air-conditioning system according to the present invention comprises diagnostic control means which drive output devices constituting the automatic air-conditioning system in accordance with a prescribed property based on a set temperature, and a diagnostic setting unit for allowing the diagnostic control means to be set to an operable status.

DESCRIPTION OF THE PREFERRED EMBODIMENT

Figure 1:
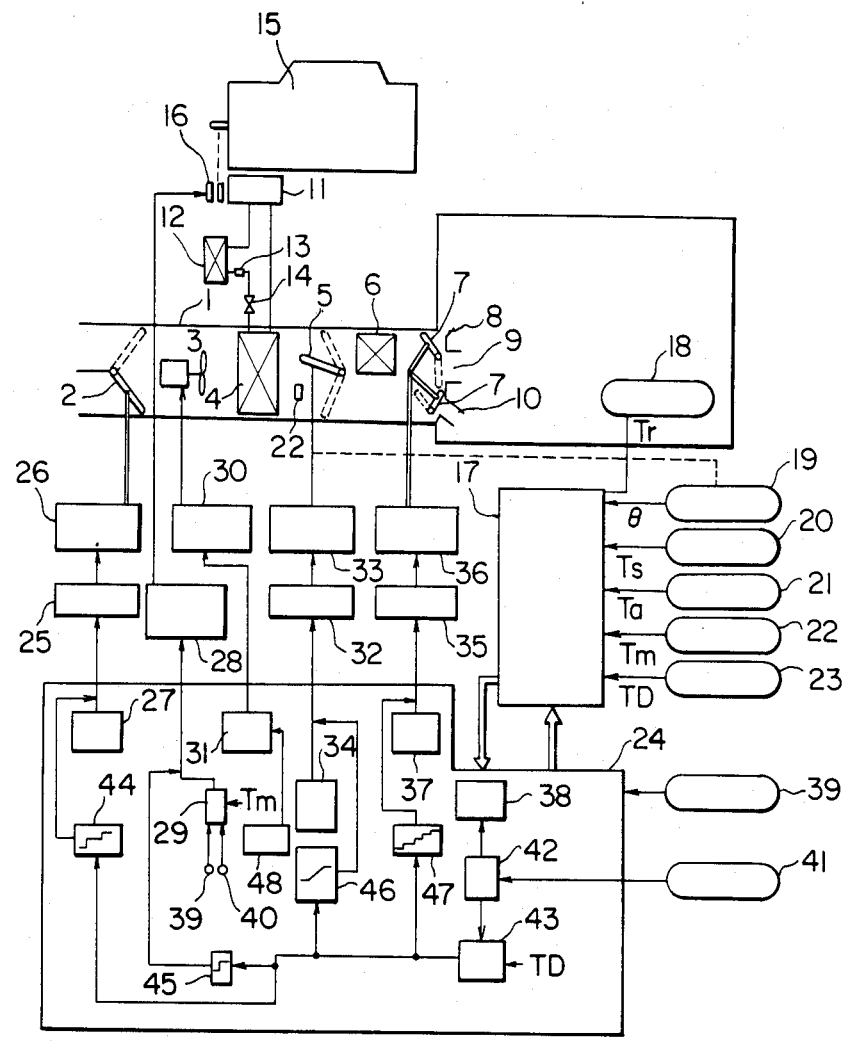
FIG. 1 is a block diagram showing the general constitution of an automotive air-conditioning system according to the present invention.
Figure 2:
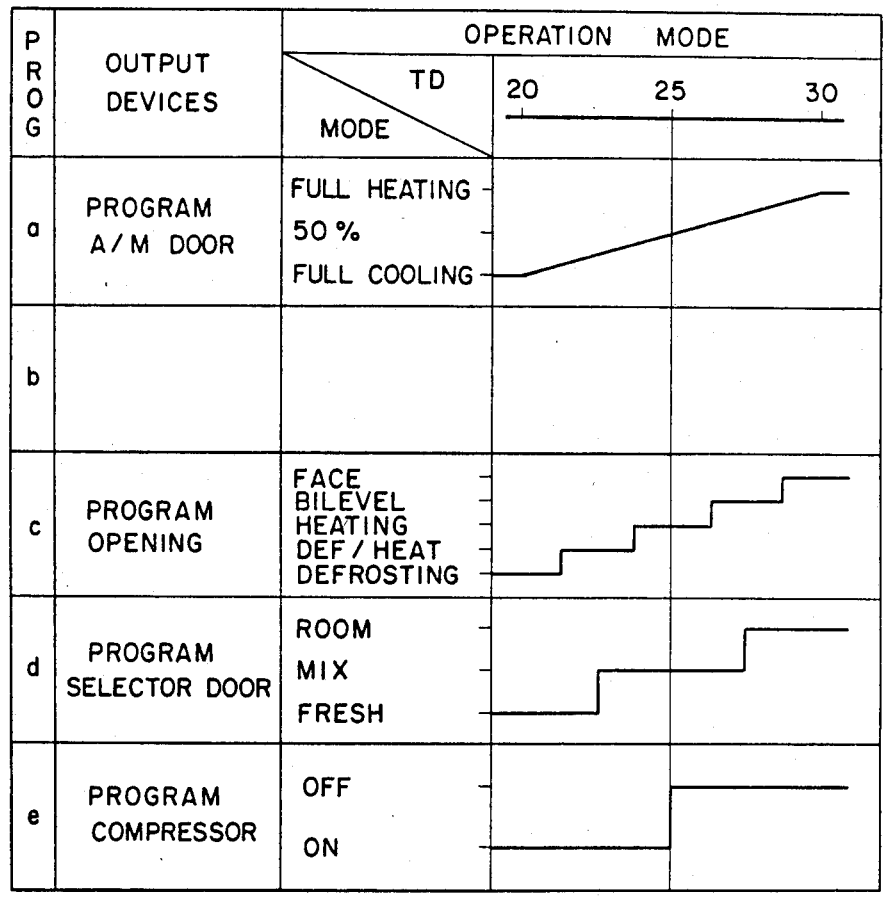
FIG. 2 is a chart showing an explanation of the operable status of the automotive air-conditioning system of FIG. 1.

In FIGS. 1 to 5, like reference characters designate like or corresponding parts throughout.

In FIG. 1, indicated at 41 is a diagnostic setting switch constituting diagnostic control means which actuates a change-over means 42 by operation of the diagnostic setting switch 41, the actuated change-over means 42 interrupting the output (combined signal T) from an arithmetic means 38 for thereby allowing an output means 43 to be in an operable status. The output means 43 supplies a reference or set temperature TD set by a temperature setting unit 23 to first to fourth diagnostic control means 44, 45, 46, 47.

Designated at 48 is a fifth diagnostic control means. The first diagnostic means 44 actuates the selector door 2 in accordance with a program d in FIG. 2, and in particular moves the selector door 2 sequentially to a room air recirculating mode, a fresh air intake and room air recirculating mode, and a fresh air intake mode in response to a progressive decrease of the set temperature TD.

The second diagnostic control means 45 actuates the compressor 11 in accordance with a program e for thereby changing the compressor 11 to be turned on or off when the set temperature TD is respectively below or above a prescribed value. The third diagnostic control means 46 actuates the air mixing door 5 in accordance with the program a for thereby controlling it to progressively move in the direction from a full cooling mode to a full heating mode with a progressive increase of the setting temperature TD. The fourth diagnostic control means 47 controls the mode changing door 7 in accordance with the program c for thereby sequentially setting the mode changing door 7 to a face mode, bilevel bode, heating mode, defrosting/heating mode, and defrosting mode as the set temperature TD is progressively decreased. Defrosting/heating mode is the mode in which the air is blown through both the window defrosting opening 8 and the foot opening 10. The fifth diagnostic control means 3 allows the blower 3 to be turned off when the off-setting switch 39a of the manual switch is operated, to be turned off when the automatic control setting switch 39b is operated, to be set to the setting speed in response to the operable condition of the low speed setting switch, middle speed setting switch and high speed setting switch when the switches other than the off-setting switch and the automatic control setting switch are operated and the air blowing mode is face mode. When the diagnostic setting switch 41 is turned off, the output means 43 is deactuated by means of changeover means 42 and the arithmetic means 38 is in an operable condition. Control means 27, 31, 34, 37 are actuated based on the combined signal T as the output from the arithmetic means 38 so that each of the output devices such as the air mixing door 5 is actuated to effect the normal air conditioning and the room temperature is kept under a set temperature.

Figure 3:
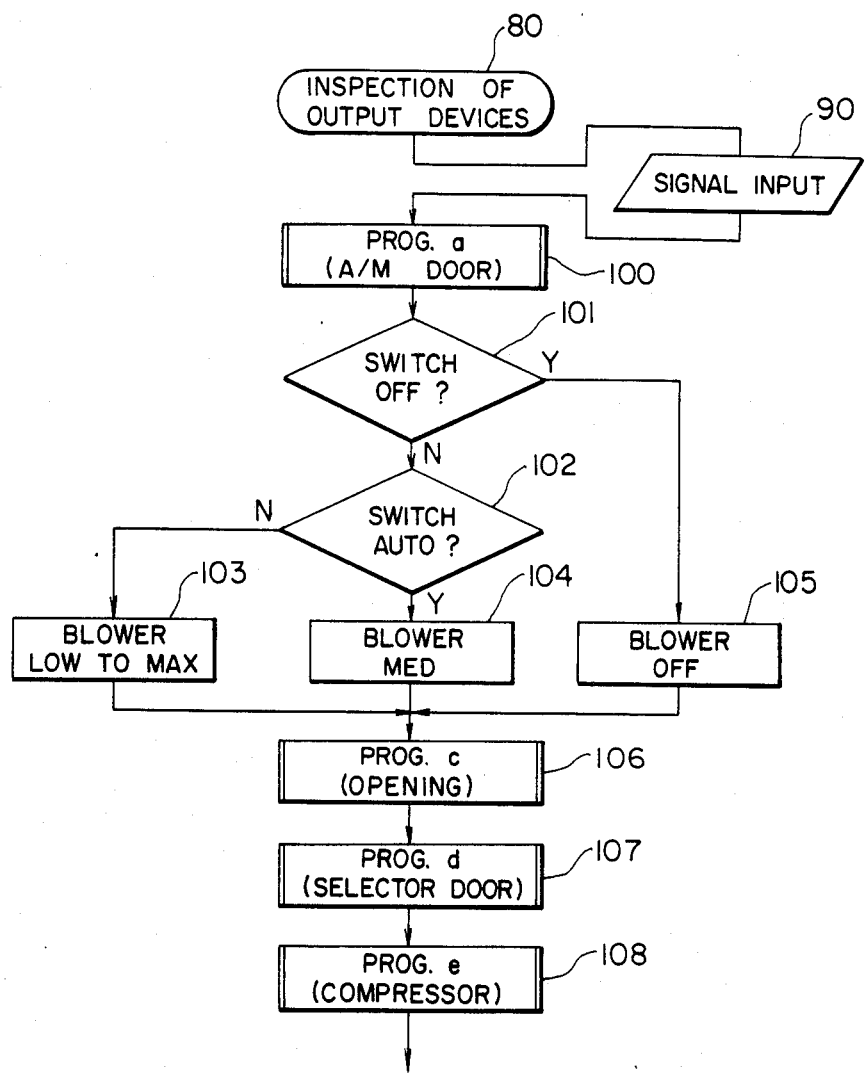
FIG. 3 is a flow chart of a control program for controlling the operation of the automotive air-conditioning system of FIG. 1.
Figure 4:
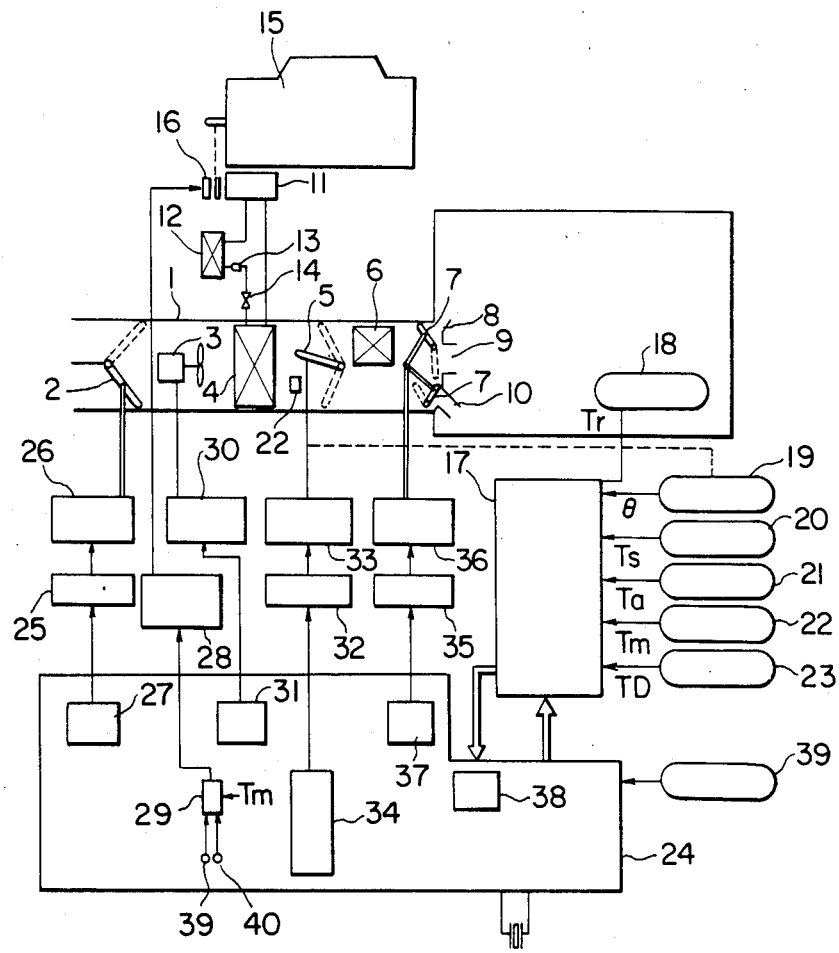
FIG. 4 is a block diagram showing the general constitution of a conventional automotive air-conditioning system.
Figure 5:
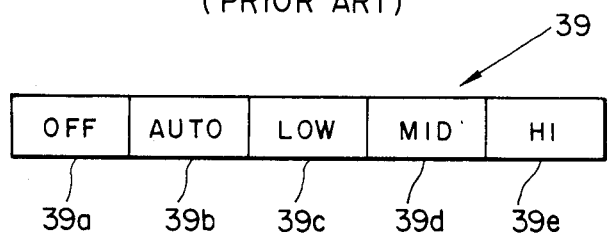
FIG. 5 is a view showing a conventional manual switch comprising five switches.

At Step 80 in FIG. 3, the diagnostic setting switch 41 is turned on to facilitate an inspection of the output devices, and at Step 90 a signal corresponding to the set temperature TD is applied to the output means 43 which delivers the set temperature TD to the diagnostic control means 44, 45, 46 and 47. At step 100, the third diagnostic control means 46 controls the air mixing door 5 based on the program a in FIG. 2 and a decision is made as to whether the manual switch 39 is in the off position or not at Step 101 to allow the blower 3 to be turned off at the stop position in step 105, and at Step 102 a decision is made as to whether the manual switch 39 is in an automatic control position or not to allow the blower 3 to be operated at the middle speed at Step 104 at the automatic control position, or to be operated at other speeds corresponding to the positions of the manual switch 39 at step 103.

At step 106, the mode of the mode changing door 7 is set based on the program c, the selector door 7 is controlled based on the program d at Step 107, and the compressor is controlled based on the program e at Step 108.

Provided that the setting temperature TD of the temperature setting unit 23 is set to for example from 20° C. to 30° C., each of the output devces is desirably set to the appropriate mode in response to the setting value. For example, when the compressor 11 is to be turned on or off, the set temperature TD of the temperature setting unit 23 is increased or decreased around 25° C., and this is applied to other output devices. This is able to be effected in the off condition, middle speed condition, or manual setting condition of the blower. Especially, when the manual switch 39 is set to the automatic control position, the blowing rate is kept at the middle speed whenever the temperature setting unit 23 is in any value for thereby effecting easily the diagnosis of the output devices such as the air mixing door or the like.

According to the present invention, an operator can inspect the output devices by operating the temperature setting unit. Further, the same output devices are repetitively inspected without losing time and all the devices are operable by operating a single means to thereby reduce the service time.

Although a certain preferred embodiment has been shown and described, it should be understood that many changes and modifications may be made therein without departing from the scope of the appended claims.

What is claimed is:

1. A system for air-conditioning a compartment of a vehicle, comprising temperature setting means for producing a set temperature signal, sensor means responsive to a temperature in the compartment for producing a compartment temperature signal, a plurality of controllable output devices, arithmetic means responsive to said set temperature signal and said compartment temperature signal for producing an output signal, air-conditioning control means responsive to said output signal of said arithmetic means for controlling said output devices in a manner effecting air-conditioning of the compartment, selectively actuatable diagnostic control means for controlling said output devices in response to variations in said set temperature, said diagnostic control means including change-over means responsive to actuation of said diagnostic control means for interrupting control of said output devices by said air-conditioning control means, and diagnostic setting means for selectively actuating and deactuating said diagnostic control means.

2. A system according to claim 1, wherein said output devices include an air mixing door, a compressor, a selector door, a mode changing door, and a blower.

3. A system according to claim 2, wherein said diagnostic control means includes selector door diagnostic means for effecting movement of said selector door to one of a fresh air intake position and a compartment air recirculating position in a predefined manner in dependence on the value of said set temperature signal from said temperature setting means.

4. A system according to claim 2, wherein said diagnostic control means includes compressor diagnostic means for causing said compressor to be in one of an on condition and an off condition in a predefined manner in dependence on the value of said set temperature signal from said temperature setting means.

5. A system according to claim 2, wherein said diagnostic control means includes air mixing door diagnostic means for effecting movement of said air mixing door to one of a plurality of operational positions in a predefined manner in dependence on the value of said set temperature from said temperature setting means.

6. A system according to claim 2, wherein said diagnostic control means includes mode changing door diagnostic means for effecting movement of said mode changing door to one of a face position, a bilevel position, a heating position, a defrosting/heating position, and a defrosting position in a predefined manner in dependence on the value of said set temperature signal from said temperature setting means.

7. A system according to claim 2, including manually actuable switch means for selecting a blower speed, and wherein said diagnostic control means includes blower diagnostic means for causing said blower to operate at a speed selected by said switch means.

8. A system according to claim 2, including manually actuable switch means for selecting a blower speed, and wherein said diagnostic control means includes: selector door diagnostic means for effecting movement of said selector door to one of a fresh air intake position and a compartment air recirculating position in a predefined manner in dependence on the value of said set temperature signal from said temperature setting means; compressor diagnostic means for causing said compressor to be in one of an on condition and an off condition in a predefined manner in dependence on the value of said set temperature signal from said temperature setting means; air mixing door diagnostic means for effecting movement of said air mixing door to one of a plurality of operational positions in a predefined manner in dependence on the value of said set temperature from said temperature setting means; mode changing door diagnostic means for effecting movement of said mode changing door to one of a face position, a bilevel position, a heating position, a defrosting/heating position, and a defrosting position in a predefined manner in dependence on the value of said set temperature signal from said temperature setting means; and blower diagnostic means for causing said blower to operate at a speed selected by said switch means.

9. A system according to claim 8, wherein said blower has low, middle and high speeds, wherein said switch means can select an automatic operational mode, and wherein said blower diagnostic means causes said blower to operate at said middle speed when said switch means is selecting said automatic operational mode.

* * * * *